Jan. 26, 1932.  G. ZIEHL  1,843,059
RUNNER FOR FRAMELESS SLIDING GLASS DOORS
Filed March 28, 1930

INVENTOR
GUSTAV ZIEHL

Patented Jan. 26, 1932

1,843,059

UNITED STATES PATENT OFFICE

GUSTAV ZIEHL, OF RODENKIRCHEN, NEAR COLOGNE, GERMANY

RUNNER FOR FRAMELESS SLIDING GLASS DOORS

Application filed March 28, 1930, Serial No. 439,773, and in Germany March 30, 1929.

Runners for frameless glass sliding doors are known in which a rail of H-shape in cross-section for holding the door encloses a rail moving on ball bearings. In this construction the door-holding rail is a solid H-shaped rail, and the rail which moves on ball bearings is a steel rail with its short legs resting on the balls.

According to the present invention, a runner for frameless glass sliding doors comprises a door-holding rail of folded sheet metal, holding, by means of its free resilient legs, a rail having indented races, which is movable on ball bearings. The rail which moves on ball bearings is pressed or drawn from sheet metal and is similar to runners already in use in connection with sliding curtains. This has the advantage over known runners for frameless glass sliding doors that the legs of the rail which runs on ball bearings and the free legs of the door-holding rail are resilient, so that the ball bearings can be pressed into and levered out of the inner rail. This is of great importance because the balls must be taken out when the rail is to be stained and nickeled and later on pressed back into position without bulges or dents being produced on the races of the rail.

The accompanying drawings illustrate, on an enlarged scale, one form of the device according to the invention.

Figure 1:
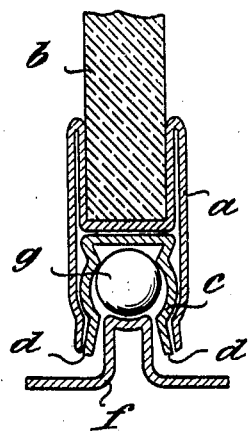
Figure 2:
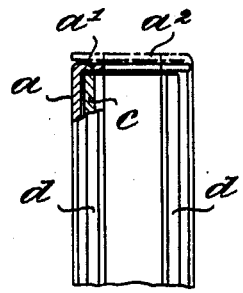

Figure 1 is a cross-section through the runner of a frameless glass sliding door ready for use, and Figure 2 is a plan of one end of the ball-guiding and carrying rails partly in section.

In the runner illustrated, a rail $a$ for holding a glass door $b$, is made, for example, from hard brass and is folded so as to be double sided. A rail $c$, such as has already been used in connection with sliding curtains, pressed or drawn, for example, from hard brass and having its sides pressed in to form races for balls $g$, is inserted in the lower side of the glass holding rail, so that its flanges $d$ cover in known manner the raised part of a rail $f$ which may also be made of drawn or pressed metal.

As the door-holding rail $a$, which extends to the lower edge of the rail $c$, and the rail $c$ are drawn from hard sheet metal and are resilient, the ball bearings $g$ between the two flanges or legs $d$ can be pressed into or out of the rail $c$. The hardness of the material prevents dents being made on the under inner border of the rail $c$. In order to prevent the inner rail $c$ which is inserted into the outer rail $a$ from moving within the latter when the sliding door is moved and also to provide terminating points at the ends of the rail $a$, the rail $a$ is provided at each end with one or two lugs $a'$, $a^2$ which form extensions of the lateral flanges; these lugs are bent at right-angles over the ends of the rail $c$ (Figure 2) and then soldered on.

I claim:

A runner for a frameless glass sliding door comprising an outer sheet metal rail of H-section, the upper channel designed to receive the edge of the door, with the lower channel extended below the door edge, a resilient inverted channel section to be inserted in and resiliently held by the walls of the lower channel of the H-section, and ball-like bearing elements resiliently held within said inverted channel section to thereby present a ball bearing unit from which the balls are removable at will.

In testimony whereof I have signed my name to this specification.

GUSTAV ZIEHL.